United States Patent
Ito et al.

(10) Patent No.: US 11,586,032 B2
(45) Date of Patent: Feb. 21, 2023

(54) LASER APPARATUS AND EXTREME ULTRAVIOLET LIGHT GENERATION SYSTEM

(71) Applicant: Gigaphoton Inc., Tochigi (JP)

(72) Inventors: Hiroyuki Ito, Oyama (JP); Hiroshi Tanaka, Oyama (JP)

(73) Assignee: Gigaphoton Inc., Tochigi (JP)

(*) Notice: Subject to any disclaimer, the term of this patent is extended or adjusted under 35 U.S.C. 154(b) by 926 days.

(21) Appl. No.: 16/435,986

(22) Filed: Jun. 10, 2019

(65) Prior Publication Data

US 2019/0293922 A1    Sep. 26, 2019

Related U.S. Application Data

(63) Continuation of application No. PCT/JP2017/003009, filed on Jan. 27, 2017.

(51) Int. Cl.
*H05G 2/00*     (2006.01)
*H01S 3/00*     (2006.01)
(Continued)

(52) U.S. Cl.
CPC .......... *G02B 26/0816* (2013.01); *B23K 26/00* (2013.01); *G02B 27/1006* (2013.01); *G02B 27/145* (2013.01); *H01S 3/0071* (2013.01); *H01S 3/10* (2013.01); *H01S 3/2232* (2013.01); *H01S 3/23* (2013.01); *H01S 3/2383* (2013.01); *H05G 2/008* (2013.01)

(58) Field of Classification Search
CPC ............ G02B 26/0816; G02B 27/1006; G02B 27/145; G02B 7/1827; G02B 27/106; B23K 26/00; H01S 3/0071; H01S 3/10; H01S 3/2232; H01S 3/23; H01S 3/2383; H01S 3/10046; H01S 3/10069; H01S 3/1305; H01S 3/2391; H01S 3/2375; H05G 2/008
See application file for complete search history.

(56) References Cited

U.S. PATENT DOCUMENTS

2008/0009989 A1   1/2008  Kim et al.
2010/0117009 A1*  5/2010  Moriya .................. H05G 2/008
                                              315/111.21
(Continued)

FOREIGN PATENT DOCUMENTS

JP   H02-217039 A   8/1990
JP   H07-193871 A   7/1995
(Continued)

OTHER PUBLICATIONS

International Search Report issued in PCT/JP2017/003009; dated Apr. 11, 2017.
(Continued)

*Primary Examiner* — Xinning(Tom) Niu
(74) *Attorney, Agent, or Firm* — Studebaker & Brackett PC

(57) ABSTRACT

A laser apparatus may include: a mirror configured to reflect a laser beam; an actuator configured to operate the mirror; and a controller configured to transmit a movement instruction to the actuator, wherein the controller predicts a movement completion time of the actuator, and transmits a polling signal so that the actuator receives the polling signal after expiration of the predicted movement completion time.

5 Claims, 11 Drawing Sheets

(51) Int. Cl.
*G02B 26/08* (2006.01)
*G02B 27/10* (2006.01)
*G02B 27/14* (2006.01)
*H01S 3/223* (2006.01)
*H01S 3/23* (2006.01)
*H01S 3/10* (2006.01)
*B23K 26/00* (2014.01)

(56) References Cited

U.S. PATENT DOCUMENTS

| | | | | |
|---|---|---|---|---|
| 2010/0220756 A1* | 9/2010 | Krzysztof | ............... | H01S 3/235 372/50.22 |
| 2011/0141865 A1* | 6/2011 | Senekerimyan | ....... | H05G 2/008 |
| 2012/0243036 A1 | 9/2012 | Aoki et al. | | |
| 2014/0044226 A1 | 2/2014 | Campbell et al. | | |
| 2014/0239203 A1* | 8/2014 | Umeda | .................. | H05G 2/008 222/146.2 |
| 2015/0346457 A1 | 12/2015 | Kawasuji et al. | | |
| 2016/0114576 A1* | 4/2016 | Tobita | .................... | B41J 2/2146 347/14 |

FOREIGN PATENT DOCUMENTS

| | | |
|---|---|---|
| JP | H08-180287 A | 7/1996 |
| JP | 2006-268310 A | 10/2006 |
| JP | 2009-530186 A | 8/2009 |
| JP | 2010-073113 A | 4/2010 |
| JP | 2010-191682 A | 9/2010 |
| JP | 2012-205017 A | 10/2012 |
| WO | 2014/119200 A1 | 8/2014 |

OTHER PUBLICATIONS

Written Opinion issued in PCT/JP2017/003009; dated Apr. 11, 2017.

* cited by examiner

LASER APPARATUS AND EXTREME ULTRAVIOLET LIGHT GENERATION SYSTEM

CROSS-REFERENCE TO RELATED APPLICATIONS

The present application is a continuation application of International Application No. PCT/JP2017/003009 filed on Jan. 27, 2017. The content of the application is incorporated herein by reference in its entirety.

BACKGROUND

1. Technical Field

The present disclosure relates to a laser apparatus and an extreme ultraviolet light generation system.

2. Related Art

Recently, miniaturization of semiconductor processes has involved increasing miniaturization of transfer patterns for use in photolithography of the semiconductor processes. In the next generation, microfabrication at 20 nm or less will be required. Thus, development of an exposure device is expected including a combination of an apparatus for generating extreme ultraviolet (EUV) light having a wavelength of about 13 nm and reduced projection reflective optics.

Three types of EUV light generation apparatuses have been proposed: an LPP (Laser Produced Plasma) type apparatus using plasma generated by irradiating a target substance with a laser beam, a DPP (Discharge Produced Plasma) type apparatus using plasma generated by discharge, and an SR (Synchrotron Radiation) type apparatus using synchrotron radiation.

LIST OF DOCUMENTS

Patent Documents

Patent Document 1: Japanese Unexamined Patent Application Publication No. 2-217039
Patent Document 2: Japanese Unexamined Patent Application Publication No. 2006-268310
Patent Document 3: Japanese Unexamined Patent Application Publication No. 2010-191682

SUMMARY

A laser apparatus according to one aspect of the present disclosure may include: a mirror configured to reflect a laser beam; an actuator configured to operate the mirror; and a controller configured to transmit a movement instruction to the actuator, the controller predicting a movement completion time of the actuator, and transmitting a polling signal so that the actuator receives the polling signal after expiration of the predicted movement completion time.

An extreme ultraviolet light generation system according to one aspect of the present disclosure may include: an actuator configured to operate an object to be moved; and a controller configured to transmit a movement instruction to the actuator, the controller predicting a movement completion time of the actuator, and transmitting a polling signal so that the actuator receives the polling signal after expiration of the predicted movement completion time.

BRIEF DESCRIPTION OF THE DRAWINGS

With reference to the accompanying drawings, some embodiments of the present disclosure will be described below merely by way of example.

DESCRIPTION OF EMBODIMENTS

Figure 1:
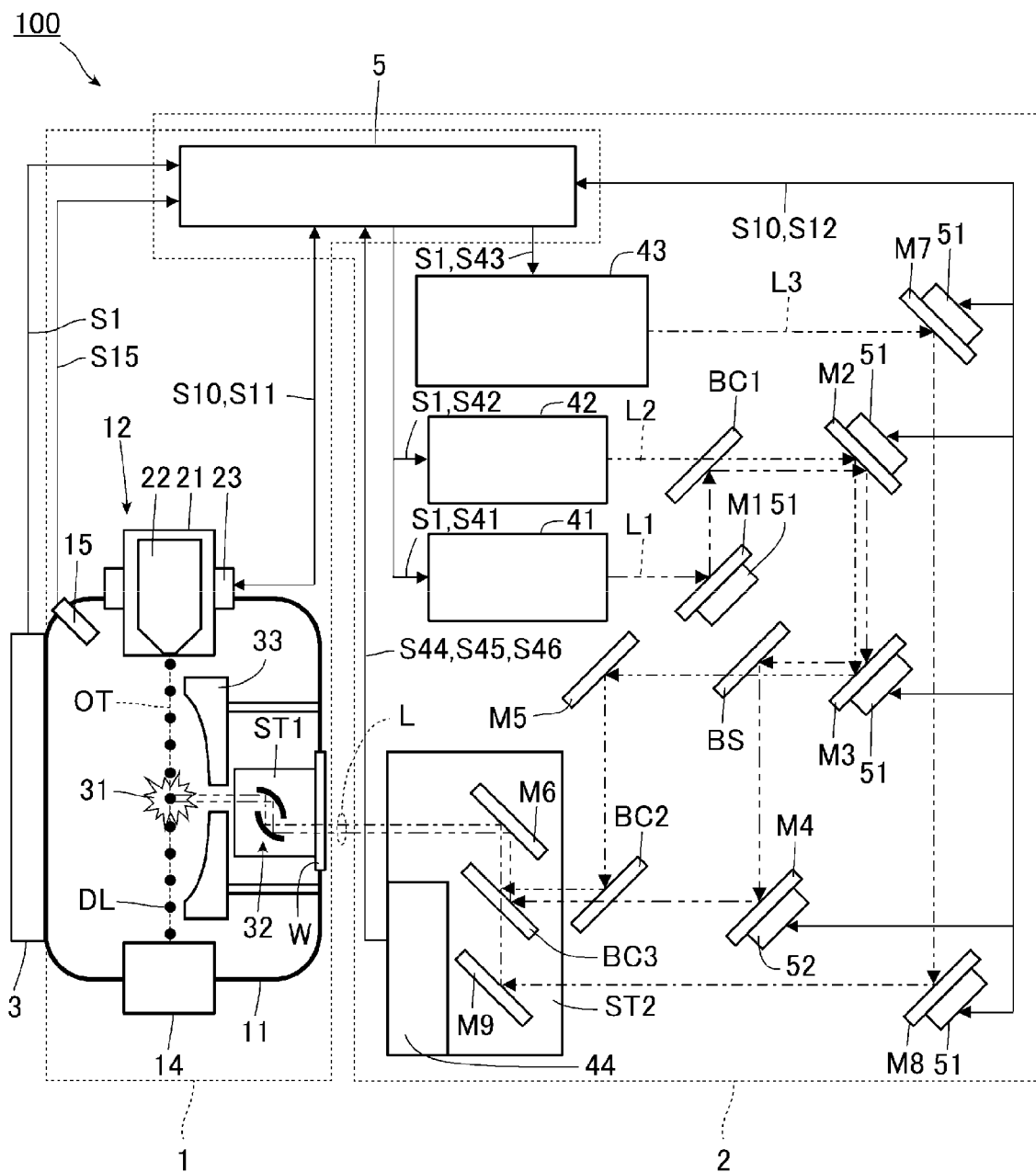
FIG. 1 diagrammatically shows a schematic exemplary configuration of an entire extreme ultraviolet light generation system.

1. Outline
2. Description of extreme ultraviolet light generation system
   2.1 Overall configuration
   2.2 Configuration of beam sensor module
   2.3 Operation
3. Description of EUV light generation control unit of comparative example
   3.1 Configuration
   3.2 Operation
   3.3 Problem
4. Description of EUV light generation control unit of Embodiment 1
   4.1 Configuration
   4.2 Operation
   4.3 Effect
5. Description of EUV light generation control unit of Embodiment 2
   5.1 Configuration
   5.2 Operation
   5.3 Effect
6. Description of EUV light generation control unit of Embodiment 3
   6.1 Configuration
   6.2 Operation
   6.3 Effect Now, with reference to the drawings, embodiments of the present disclosure will be described in detail.

The embodiments described below illustrate some examples of the present disclosure, and do not limit contents of the present disclosure. Also, all configurations and operations described in the embodiments are not necessarily essential as configurations and operations of the present disclosure.

Like components are denoted by like reference numerals, and overlapping descriptions are omitted.

1. Outline

Embodiments of the present disclosure relate to an extreme ultraviolet (EUV) light generation apparatus that generates light having a wavelength of extreme ultraviolet light, and a laser apparatus used for generating the light. Hereinafter, the extreme ultraviolet light is sometimes referred to as EUV light, and a controller for generating the EUV light is sometimes referred to as an EUV light generation control unit.

2. Description of Extreme Ultraviolet Light Generation System

2.1 Overall Configuration

FIG. 1 diagrammatically shows a schematic exemplary configuration of an entire extreme ultraviolet light generation system. As shown in FIG. 1, an EUV light generation system 100 includes an extreme ultraviolet light generation apparatus 1 and a laser apparatus 2. The EUV light generation system 100 is used together with an exposure device 3.

The exposure device 3 exposes a semiconductor wafer to EUV light generated by the extreme ultraviolet light generation apparatus 1, and outputs a burst signal S1 to the extreme ultraviolet light generation apparatus 1. The burst signal S1 designates a burst period for generating the EUV light and an intermission period for stopping generation of the EUV light. For example, a burst signal S1 to alternately repeat the burst period and the intermission period is output from the exposure device 3 to the extreme ultraviolet light generation apparatus 1.

The extreme ultraviolet light generation apparatus 1 includes a chamber 11 and a target supply unit 12. The chamber 11 is a container that can be sealed and reduced in pressure. The target supply unit 12 is configured to supply a target substance as a droplet DL into the chamber 11.

In the example in FIG. 1, the target supply unit 12 may include a subchamber 21 movably supported by the chamber 11, a target ejector 22 arranged in the subchamber 21, and an actuator 23 connected to the subchamber 21. The target ejector 22 is configured to store a target substance of molten metal, and eject the target substance as the droplet DL. A material of the target substance may include tin, terbium, gadolinium, lithium, xenon, or any combinations of two of them, but not limited to them.

The actuator 23 includes a communication unit that transmits/receives various types of information, and is configured to operate the subchamber 21 according to a movement instruction transmitted from a controller. The actuator 23 is operated to adjust an ejection position or the like of the droplet DL ejected from the target ejector 22 in the subchamber 21. The actuator 23 may include a stage that movably supports the subchamber 21.

A wall of the chamber 11 has at least one through hole. The through hole is closed by a window W, and a laser beam L from the laser apparatus 2 passes through the window W and enters the chamber 11.

In the chamber 11, part of a trajectory OT of the droplet DL supplied from the target supply unit 12 is a plasma generation region 31. The plasma generation region 31 turns the droplet DL into plasma, and the laser beam L passing through the window W and entering the chamber 11 is focused on the plasma generation region 31 by a laser beam focusing optical system 32.

The laser beam focusing optical system 32 may be arranged on a stage ST1 movable in three axial directions, and moving the stage ST1 may change a focusing position on which the laser beam L is focused by the laser beam focusing optical system 32.

In the chamber 11, an EUV focusing mirror 33 is also provided. The EUV focusing mirror 33 has, for example, a spheroidal reflection surface. The EUV focusing mirror 33 selectively reflects, on the reflection surface, EUV light generated by the droplet DL reaching the plasma generation region 31 and being turned into plasma, and outputs the EUV light to the exposure device 3.

The extreme ultraviolet light generation apparatus 1 further includes a target recovery unit 14 and a target sensor 15. The target recovery unit 14 is configured to recover the droplet DL that has not been turned into plasma in the plasma generation region 31 among the droplets DL supplied into the chamber 11. For example, the target recovery unit 14 is provided on the trajectory OT of the droplet DL on a wall of the chamber 11 opposite to a wall to which the target supply unit 12 is mounted.

The target sensor 15 is configured to obtain droplet-related information including presence, a path, a position, a speed, or the like of the droplet DL supplied into the chamber 11 and output the information as a droplet-related signal S15. For example, the target sensor 15 may be provided to extend through the wall of the chamber 11.

The laser apparatus 2 includes a first prepulse laser 41, a second prepulse laser 42, and a main pulse laser 43. The first prepulse laser 41, the second prepulse laser 42, and the main pulse laser 43 may be the same pulse laser or different pulse lasers. Such a pulse laser includes, for example, a solid-state laser or a gas laser. Examples of the solid-state laser include an Nd:YAG laser, an Nd:YVO4 laser, and a laser that outputs harmonic light thereof. Examples of the gas laser include a $CO_2$ laser and an excimer laser.

The first prepulse laser 41 is configured to emit a laser beam L1 having, for example, a wavelength of 1.06 μm and a pulse width of less than 1 ns. The second prepulse laser 42 is configured to emit a laser beam L2 having, for example, a wavelength of 1.06 μm and a pulse width of 1 ns. The main pulse laser 43 is constituted by a $CO_2$ laser configured to emit a laser beam L3 having, for example, a wavelength of 10.6 μm and a pulse width of several tens of nanoseconds. A polarization direction of the laser beam L1 emitted from the first prepulse laser 41 is perpendicular to a polarization direction of the laser beam L2 emitted from the second prepulse laser 42.

The laser apparatus 2 further includes a plurality of optical elements. In the example in FIG. 1, a first mirror M1, a first beam combiner BC1, a second mirror M2, a third mirror M3, and a beam splitter BS are provided. The first beam combiner BC1 substantially matches an optical path of the laser beam L1 emitted from the first prepulse laser 41 and reflected by the first mirror M1 with an optical path of the laser beam L2 emitted from the second prepulse laser 42. The first beam combiner BC1 may be constituted by, for example, a polarization beam splitter. The beam splitter BS splits the laser beams having the optical paths substantially matched by the first beam combiner BC1 and sequentially reflected by the second mirror M2 and the third mirror M3 into the laser beam L1 and the laser beam L2. The beam splitter BS can be constituted by, for example, a polarization beam splitter.

A transmission channel between the second mirror M2 and the third mirror M3 may have a relatively long distance such as of several tens of meters. In this case, as in the example in FIG. 1, the first beam combiner BC1 is provided before the transmission channel having the long distance to allow the laser beam L1 and the laser beam L2 having the same wavelength to be transmitted by a set of the second mirror M2 and the third mirror M3. Thus, even if the transmission channel between the second mirror M2 and the third mirror M3 has the long distance, the number of optical components can be reduced as compared to the case where separate mirrors are provided in a transmission channel of the laser beam L1 and a transmission channel of the laser beam L2 without providing the first beam combiner BC1 before the transmission channel having the long distance.

In the example in FIG. 1, a fourth mirror M4, a fifth mirror M5, a second beam combiner BC2, a third beam combiner BC3, and a sixth mirror M6 are provided behind the beam splitter BS. Further, in the example in FIG. 1, a seventh mirror M7, an eighth mirror M8, and a ninth mirror M9 are provided on an optical path of the main pulse laser 43.

The second beam combiner BC2 substantially matches the optical path of the laser beam L1 split by the beam splitter BS and reflected by the fourth mirror M4 with the optical path of the laser beam L2 split by the beam splitter BS and reflected by the fifth mirror M5. The second beam combiner BC2 may be constituted by, for example, a polarization beam splitter. The third beam combiner BC3 substantially matches the optical paths of the laser beams L1, L2 which have been substantially matched by the second beam combiner BC2, and an optical path of the laser beam L3 emitted from the main pulse laser 43 and sequentially reflected by the seventh mirror M7, the eighth mirror M8, and the ninth mirror M9. The third beam combiner BC3 may be constituted by, for example, a dichroic mirror. The laser beam L includes the laser beam L1, the laser beam L2, and the laser beam L3 having the optical paths substantially matched. The laser beam L is output from the laser apparatus 2, passes through the window W, and travels toward the laser beam focusing optical system 32.

A wavelength of the laser beam L1 emitted from the first prepulse laser 41 and the laser beam L2 emitted from the second prepulse laser 42 may be different from a wavelength of the laser beam L3 emitted from the main pulse laser 43. In this case, transmission channels of the laser beams having different wavelengths are preferably separately provided to reduce transmission loss. Thus, in the example in FIG. 1, the seventh mirror M7, the eighth mirror M8, and the ninth mirror M9 suitable for the wavelength of the laser beam L3 are arranged on the optical path different from the optical paths of the laser beam L1 and the laser beam L2 to reduce transmission loss.

An actuator 51 is connected to each of the first mirror M1, the second mirror M2, the third mirror M3, the seventh mirror M7, and the eighth mirror M8, and operated to adjust a position and an angle of a reflection surface. A high-speed actuator 52 is connected to the fourth mirror M4, and operated to adjust a position and an angle of a reflection surface. On the other hand, the sixth mirror M6 and the ninth mirror M9 are secured at predetermined positions on a stage ST2, and the fifth mirror M5 is secured to a holder (not shown). Either the actuator 51 or the high-speed actuator 52 may be connected to all or some of the fifth mirror M5, the sixth mirror M6, and the ninth mirror M9.

The actuator 51 includes a communication unit that transmits/receives various types of information, and is configured to operate one mirror to be operated which is connected to the actuator 51 according to a movement instruction transmitted from the controller. The actuator 51 may include a mirror holder that movably supports the mirror connected to the actuator 51.

The high-speed actuator 52 includes a communication unit that transmits/receives various types of information similarly to the actuator 51, and is configured to operate the fourth mirror M4 at higher speed than the operation of the actuator 51 according to a movement instruction transmitted from the controller. For example, the high-speed actuator 52 can move the fourth mirror M4 for each pulse of the pulsed laser beam L1 at minimum. The high-speed actuator 52 may include a mirror holder that movably supports the fourth mirror M4 connected to the high-speed actuator 52.

The laser apparatus 2 further includes a beam sensor module 44. The beam sensor module 44 is configured to obtain beam-related information including a beam diameter, a beam gravity center position, and a beam spread angle of each of the laser beams L1, L2, L3 propagating through the laser apparatus 2. The beam sensor module 44 is configured to generate beam-related information of the laser beam L1 as a beam-related signal S44, beam-related information of the laser beam L2 as a beam-related signal S45, and beam-related information of the laser beam L3 as a beam-related signal S46.

The extreme ultraviolet light generation apparatus 1 and the laser apparatus 2 include an EUV light generation control unit 5 as a controller that controls generation of the EUV light. Specifically, the EUV light generation control unit 5 is shared by the extreme ultraviolet light generation apparatus 1 and the laser apparatus 2.

Into the EUV light generation control unit 5, the burst signal S1 output from the exposure device 3, a droplet-related signal S15 output from the target sensor 15, and beam-related signals S44, S45, and S46 output from the beam sensor module 44 are input.

The EUV light generation control unit 5 controls, based on the burst signal S1 and the droplet-related signal S15, the laser apparatus 2 so that the laser beam L is applied to the droplet DL supplied from the target supply unit 12 into the chamber 11 and reaching the plasma generation region 31.

The EUV light generation control unit 5 controls, based on the droplet-related signal S15, the actuator 23 so that the droplet DL is ejected to a target position in the plasma generation region 31. At this time, the EUV light generation control unit 5 transmits a polling signal S10 to inquire an operation state of the actuator 23 to the actuator 23. Then, the EUV light generation control unit 5 monitors the operation state of the actuator 23 based on a polling response signal S11 returned from the actuator 23 as a response to the polling signal S10.

Further, the EUV light generation control unit 5 individually controls, based on the beam-related signals S44, S45, and S46, the plurality of actuators 51 so that the laser beam L is applied to the target position in the plasma generation region 31. At this time, the EUV light generation control unit 5 individually transmits a polling signal S10 to inquire an operation state of each actuator 51 to the actuator 51. Then, the EUV light generation control unit 5 individually monitors the operation state of the actuator 51 based on the polling response signal S12 returned from the actuator 51 as the response to the polling signal S10.

Similarly, the EUV light generation control unit 5 controls, based on the beam-related signals S44, S45, and S46, the high-speed actuator 52 so that the laser beam L is applied to the target position in the plasma generation region 31. The high-speed actuator 52 can move the fourth mirror M4 for each pulse of the pulsed laser beam L1 at minimum as described above. Thus, the EUV light generation control unit 5 needs not transmit the polling signal S10 to the high-speed actuator 52.

The above control is merely exemplary, and different control may be performed instead or may be added.

2.2 Configuration of Beam Sensor Module

Figure 2:
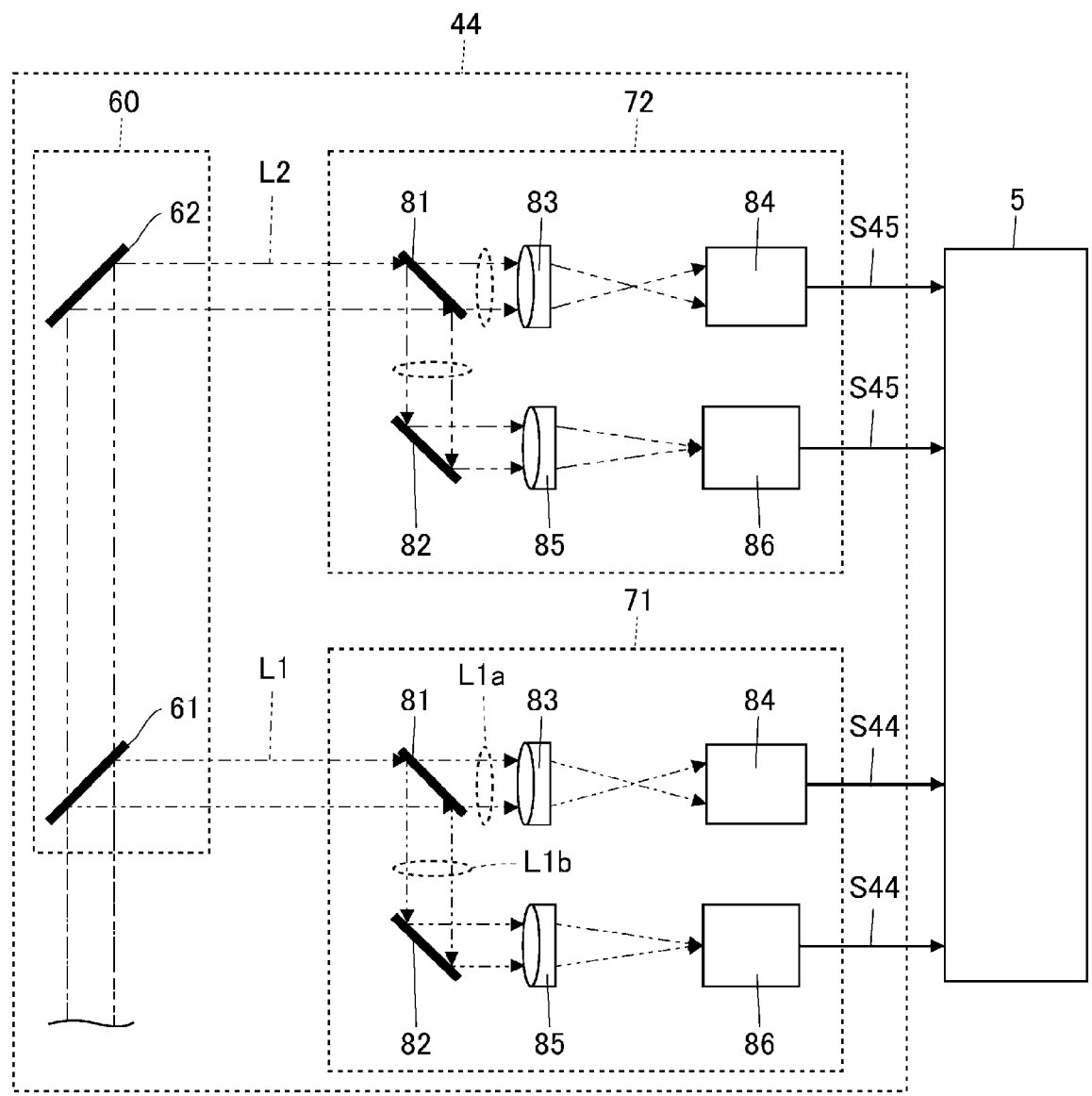
FIG. 2 diagrammatically shows a detailed exemplary configuration of part of a beam sensor module.

Next, the beam sensor module 44 will be further described in detail. FIG. 2 diagrammatically shows a detailed exemplary configuration of part of the beam sensor module 44. As shown in FIG. 2, the beam sensor module 44 includes a transmission optical system 60, a first measurement unit 71, and a second measurement unit 72.

The transmission optical system 60 uses a beam splitter 61 to split part of the laser beam passing through the third beam combiner BC3 in FIG. 1 into the laser beam L1 and the laser beam L2, and transmits the laser beam L1 to the first measurement unit 71. The transmission optical system 60 also uses a mirror 62 to reflect the laser beam L2 split by the beam splitter 61 and transmits the laser beam L2 to the second measurement unit 72.

The first measurement unit 71 is configured to measure beam-related information such as a beam diameter, a beam gravity center position, a beam spread angle, or a beam traveling angle of the laser beam L1. For example, the first measurement unit 71 may include a beam splitter 81, a mirror 82, a transfer lens 83, a position sensor 84, a condenser lens 85, and a pointing sensor 86.

The beam splitter 81 splits the laser beam L1 transmitted by the transmission optical system 60 into a laser beam L1a for transfer and a laser beam L1b for focusing. The mirror 82 reflects the laser beam L1b for focusing to the condenser lens 85.

The transfer lens 83 transfers energy distribution of the laser beam L1a for transfer incident from the beam splitter 81 in a beam cross section at a predetermined position onto a light receiving surface of the position sensor 84. The position sensor 84 obtains the energy distribution of the laser beam L1a for transfer that is transferred onto the light receiving surface as an image, and outputs the image to the EUV light generation control unit 5 as the beam-related signal S44. As described above, the image of the laser beam L1a for transfer shows the energy distribution of the laser beam L1a for transfer in a predetermined cross section. Thus, the beam-related signal S44 output from the position sensor 84 may include information such as a beam diameter or a beam gravity center position of the laser beam L1 in the predetermined section.

The condenser lens 85 focuses the laser beam L1b for focusing incident from the mirror 82 on a light receiving surface of the pointing sensor 86. The pointing sensor 86 obtains energy distribution of the laser beam L1b for focusing that is focused on the light receiving surface as an image, and outputs the image and a previously registered focal length of the condenser lens 85 as the beam-related signal S44. As described above, the image of the laser beam L1b for focusing shows a position of the laser beam L1b focused by the condenser lens 85, and a beam traveling angle or the like can be calculated from the position and the focal length. Thus, the beam-related signal S44 output from the pointing sensor 86 may include information such as a beam traveling angle of the laser beam L1.

The second measurement unit 72 is configured to measure beam-related information such as a beam diameter, a beam gravity center position, a beam spread angle, or a beam traveling angle of the laser beam L2. For example, the second measurement unit 72 may include the same components as the first measurement unit 71. Thus, detailed descriptions of the second measurement unit 72 will be omitted. A position sensor 84 of the second measurement unit 72 outputs a beam-related signal S45 that may include information such as a beam diameter, a beam gravity center position, or a beam traveling angle of the laser beam L2 to the EUV light generation control unit 5.

Although not shown in FIG. 2, the beam sensor module 44 also includes a third measurement unit that measures beam-related information such as a beam diameter, a beam gravity center position, a beam spread angle, or a beam traveling angle of part of the laser beam L3 reflected by the third beam combiner BC3 in FIG. 1. The third measurement unit may include the same components as the first measurement unit 71 except for being suitable for different wavelengths. Thus, detailed descriptions of the third measurement unit will be omitted. The third measurement unit outputs a beam-related signal S46 that may include information such as a beam diameter, a beam gravity center position, or a beam traveling angle of the laser beam L3 to the EUV light generation control unit 5.

2.3 Operation

The burst signal S1 output from the exposure device 3 is input to the EUV light generation control unit 5 as described above, and output to the first prepulse laser 41, the second prepulse laser 42, and the main pulse laser 43 by the EUV light generation control unit 5.

The droplet-related signal S15 output from the target sensor 15 is input to the EUV light generation control unit 5 as described above. The EUV light generation control unit 5 recognizes, based on the droplet-related signal S15, that the droplet DL has passed through a predetermined position on a side closer to the target supply unit 12 than the plasma generation region 31. Then, the EUV light generation control unit 5 outputs a first emission trigger signal S41 to the first prepulse laser 41 with a delay of a first delay time from a time point when receiving the droplet-related signal S15. The EUV light generation control unit 5 also outputs a second emission trigger signal S42 to the second prepulse laser 42 with a delay of a second delay time longer than the first delay time from the time point when receiving the droplet-related signal S15. The EUV light generation control unit 5 further outputs a third emission trigger signal S43 to the main pulse laser 43 with a delay of a third delay time longer than the second delay time from the time point when receiving the droplet-related signal S15.

The first prepulse laser 41 emits a continuous pulsed laser beam L1 in a burst period based on the burst signal S1 and the first emission trigger signal S41 output from the EUV light generation control unit 5. The second prepulse laser 42 emits a continuous pulsed laser beam L2 in the burst period based on the burst signal S1 and the second emission trigger signal S42 output from the EUV light generation control unit 5. The main pulse laser 43 outputs a continuous pulsed laser beam L3 in the burst period based on the burst signal S1 and the third emission trigger signal S43 output from the EUV light generation control unit 5.

As described above, the first emission trigger signal S41, the second emission trigger signal S42, and the third emission trigger signal S43 are output from the EUV light generation control unit 5 at different timings from the time point when the EUV light generation control unit 5 receives the droplet-related signal S15. Thus, in the burst period repeated at a predetermined cycle, at least peaks of pulses of the continuous pulsed laser beam L1, the continuous pulsed laser beam L2, and the continuous pulsed laser beam L3 do not overlap.

The laser beam L1 emitted from the first prepulse laser 41 is reflected by the first mirror M1 and propagates to the first beam combiner BC1, and the first beam combiner BC1 substantially matches the optical path of the laser beam L1 with the optical path of the laser beam L2 emitted from the second prepulse laser 42. The laser beams L1, L2 having the optical paths substantially matched by the first beam combiner BC1 are sequentially reflected by the second mirror M2 and the third mirror M3 and then split into the laser beam L1 and the laser beam L2 by the beam splitter BS.

The laser beam L1 split by the beam splitter BS is reflected by the fourth mirror M4 and propagates to the second beam combiner BC2, and the laser beam L2 split by the beam splitter BS is reflected by the fifth mirror M5 and propagates to the second beam combiner BC2. The second beam combiner BC2 again substantially matches the optical path of the laser beam L1 with the optical path of the laser beam L2, and the laser beams L1, L2 having the optical paths substantially matched propagate to the third beam combiner BC3.

The laser beam L3 emitted from the main pulse laser 43 is sequentially reflected by the seventh mirror M7, the eighth mirror M8, and the ninth mirror M9 and propagates to the third beam combiner BC3. The third beam combiner BC3 substantially matches the optical paths of the laser beam L1 and the laser beam L2 which have been substantially matched with the optical path of the laser beam L3. The laser beam L including the laser beam L1, the laser beam L2, and the laser beam L3 is reflected by the sixth mirror M6 and then output from the laser apparatus 2.

The laser beam L output from the laser apparatus 2 enters the chamber 11 through the window W in the chamber 11, is focused on the plasma generation region 31 by the laser beam focusing optical system 32, and is applied to at least one droplet DL supplied from the target supply unit 12. The droplet DL irradiated with the laser beam L1 included in the laser beam L is turned into a secondary target dispersed as a smaller drop. The secondary target irradiated with the laser beam L2 included in the laser beam L is turned into a tertiary target dispersed as a finer particle. The tertiary target irradiated with the laser beam L3 included in the laser beam L is turned into plasma, and light including EUV light is radiated from the plasma. The EUV light is selectively reflected by the reflection surface of the EUV focusing mirror 33 and output to the exposure device 3.

In the above operation, positions and angles of the laser beam L1, the laser beam L2, and the laser beam L3 sometimes need be adjusted so that the laser beam L1, the laser beam L2, and the laser beam L3 included in the laser beam L are applied to the target position in the plasma generation region 31. Next, this adjustment will be described.

When adjusting the position and the angle of the laser beam L1, the EUV light generation control unit 5 controls the actuator 51 connected to the first mirror M1 to substantially match the optical path of the laser beam L1 with the optical path of the laser beam L2. The EUV light generation control unit 5 also controls the high-speed actuator 52 connected to the fourth mirror M4 to adjust the position and the angle of the laser beam L1 in the plasma generation region 31 at high speed.

When adjusting the positions and the angles of the laser beams L1, L2 having the optical paths substantially matched, the EUV light generation control unit 5 controls at least one of the actuators 51 connected to the second mirror M2 and the third mirror M3 so that the laser beams having the optical paths substantially matched enter the beam splitter BS at predetermined positions and predetermined angles. Thus, the positions and the angles of the laser beams having the optical paths substantially matched can be adjusted to prevent displacement thereof due to long-distance laser beam transmission between the second mirror M2 and the third mirror M3.

When adjusting the position and the angle of the laser beam L3, the EUV light generation control unit 5 controls at least one of the actuators 51 connected to the seventh mirror M7 and the eighth mirror M8.

Next, detailed processing of the EUV light generation control unit 5 that controls the actuators 51 connected to the first mirror M1, the second mirror M2, the third mirror M3, the seventh mirror M7, and the eighth mirror M8, and the high-speed actuator 52 connected to the fourth mirror M4 will be described. Control processing of the actuator 51 is the same as control processing of the high-speed actuator 52, and thus only control of the actuator 51 connected to the first mirror M1 will be described in detail.

The EUV light generation control unit 5 recognizes an image of the laser beam L1 transferred onto the light receiving surface of the position sensor 84 in FIG. 2 based on the beam-related signal S44 output from the beam sensor module 44. The EUV light generation control unit 5 recognizes a gravity center position of a cross section of the laser beam L1 shown on the image of the laser beam L1, and calculates a difference from a target position previously registered in an internal memory or the like. As the difference increases, an amount of displacement of the position of the laser beam L1 relative to the target position in the plasma generation region 31 increases. Thus, the EUV light generation control unit 5 calculates an amount of movement and a movement direction of the actuator 51 connected to the first mirror M1 so that the difference becomes zero when the difference from the target position is larger than an allowable value. The EUV light generation control unit 5 transmits, to the actuator 51, a movement instruction including the amount of movement and the movement direction calculated. As long as the difference from the target position is smaller than at least the allowable value, the difference from the target position needs not be zero.

The EUV light generation control unit 5 also recognizes, from the beam-related signal S44 output from the beam sensor module 44, the image of the laser beam L1 focused on the light receiving surface of the pointing sensor 86 and a focal length of the condenser lens 85 that focuses the laser beam L1 on the light receiving surface in FIG. 2. The EUV light generation control unit 5 also recognizes a distance between a focusing position of the laser beam L1 shown on the image of the laser beam L1 and, for example, a center position of the image. Then, the EUV light generation control unit 5 uses the distance and the focal length recognized to calculate an angle of a traveling direction of the laser beam L1, and calculates a difference between the angle and a target angle previously registered in the internal memory or the like. As the difference increases, an amount of displacement of the angle of the traveling direction of the laser beam L1 relative to the target position in the plasma generation region 31 increases. Thus, the EUV light generation control unit 5 calculates an amount of movement and a movement direction of the actuator 51 connected to the first mirror M1 so that the difference becomes zero when the difference from the target angle is larger than an allowable value. The EUV light generation control unit 5 transmits, to the actuator 51, a movement instruction including the amount of movement and the movement direction calculated. As long as the difference from the target angle is smaller than at least the allowable value, the difference from the target angle needs not be zero.

As such, the EUV light generation control unit 5 can control the actuator 51 connected to the first mirror M1 to adjust the position and the angle of the laser beam L1.

3. Description of EUV Light Generation Control Unit of Comparative Example

Next, an EUV light generation control unit 5 of the comparative example will be described. Components similar to those described above are denoted by the same reference numerals, and overlapping descriptions are omitted unless otherwise stated.

3.1 Configuration

When transmitting a movement instruction to an actuator 51, the EUV light generation control unit 5 of the comparative example transmits a polling signal S10 at a predetermined polling interval from a time point when receiving the movement instruction. The polling interval is a minimum necessary time interval between transmission of a polling signal S10 and transmission of a next polling signal S10.

If a polling response signal S12 received from the actuator 51 indicates movement completion, the EUV light generation control unit 5 finishes transmitting the polling signal S10 until again transmitting a movement instruction to the actuator 51 after receiving the polling response signal S12.

3.2 Operation

Figure 3:
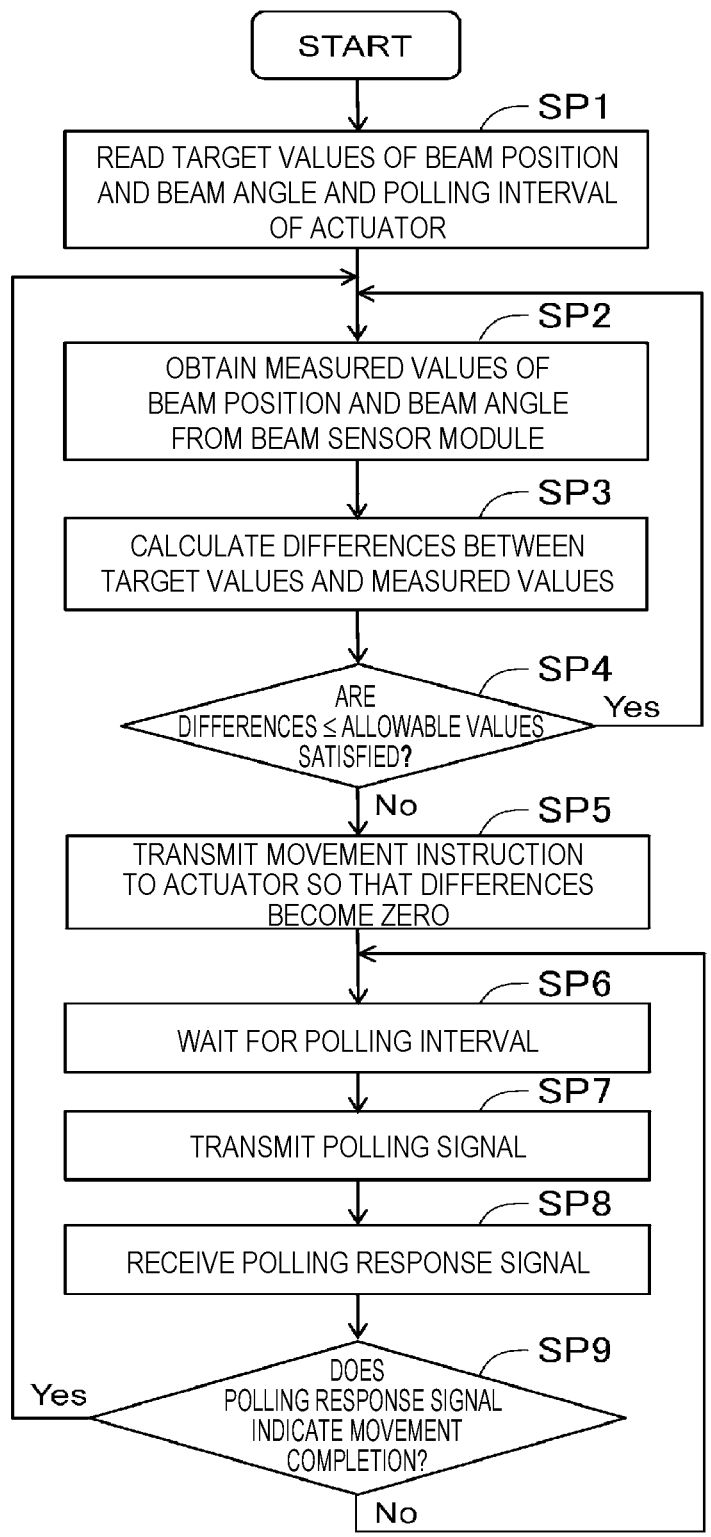
FIG. 3 is a flowchart of a control processing routine for an EUV light generation control unit of a comparative example to control an actuator.

FIG. 3 is a flowchart of a control processing routine for the EUV light generation control unit 5 of the comparative example to control the actuator 51. As shown in FIG. 3, in step SP1, the EUV light generation control unit 5 reads a polling interval of the actuator 51 previously registered in an internal memory, a target position of a laser beam L1, and a target angle of the laser beam L1, and goes to step SP2.

In step SP2, the EUV light generation control unit 5 obtains a beam-related signal S44 from a beam sensor module 44, and goes to step SP3. In step SP3, the EUV light generation control unit 5 calculates a difference from a target position and a difference from a target angle based on the beam-related signal S44 as described above, and goes to step SP4. In step SP4, the EUV light generation control unit 5 compares the difference from the target position with an allowable value, and compares the difference from the target angle with an allowable value.

If the difference from the target position and the difference from the target angle are both equal to or smaller than the allowable values, the EUV light generation control unit 5 returns to step SP2. If at least one of the difference from the target position and the difference from the target angle is larger than the allowable value, the EUV light generation control unit 5 goes to step SP5, and calculates an amount of movement and a movement direction of the actuator 51 so that the difference beyond the allowable value becomes zero. Then, the EUV light generation control unit 5 transmits a movement instruction including the amount of movement and the movement direction calculated of the actuator 51 to the actuator 51, and goes to step SP6.

In step SP6, the EUV light generation control unit 5 waits for time of the polling interval read in step SP1. Then, the EUV light generation control unit 5 goes to step SP7 at a time point at the end of the polling interval. In step SP7, the EUV light generation control unit 5 transmits a polling signal S10 to the actuator 51, and goes to step SP8.

In step SP8, the EUV light generation control unit 5 waits for a polling response signal S12 transmitted from the actuator 51, and goes to step SP9 when receiving the polling response signal S12.

In step SP9, the EUV light generation control unit 5 recognizes whether or not the polling response signal S12 indicates movement completion. If the polling response signal S12 does not indicate movement completion, the EUV light generation control unit 5 returns to step SP6, and repeats the processes in steps SP6 to SP9 until receiving a polling response signal S12 indicating movement completion.

If the polling response signal S12 indicates movement completion, the EUV light generation control unit 5 returns to step SP2, and again starts to monitor a position and an angle of a traveling direction of the laser beam L1.

3.3 Problem

Figure 4:
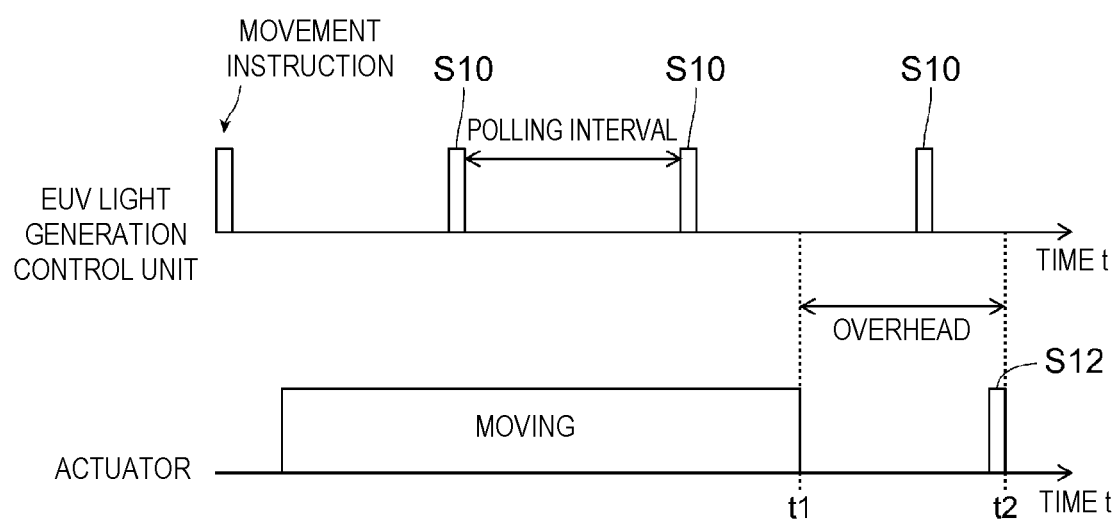
FIG. 4 is a timing chart of operations of the EUV light generation control unit and a high-speed actuator of the comparative example.

FIG. 4 is a timing chart of operations of the EUV light generation control unit 5 and the actuator 51 of the comparative example. As shown in FIG. 4, the EUV light generation control unit 5 regularly transmits the polling signal S10 at a predetermined polling interval whether the actuator 51 is moving or not. Thus, there is a shift between a time point when the actuator 51 actually completes movement and a time point when the EUV light generation control unit 5 transmits the polling signal S10, thereby easily causing overhead.

The overhead is a delay from a time point t1 when the actuator 51 actually completes movement to a time point t2 when the EUV light generation control unit 5 receives the polling response signal S12 indicating movement completion. The overhead time is a sum of the polling interval and a communication time between the actuator 51 and the EUV light generation control unit 5 at maximum. Since the polling interval is uniquely set according to a movement speed or the like of the actuator 51, the overhead time tends to increase for the actuator 51 operated at lower speed than the high-speed actuator 52.

The long overhead time may cause displacement of the position and the angle of the traveling direction of the laser beam L1 in the overhead time. However, the EUV light generation control unit 5 has not yet received the polling response signal S12 indicating movement completion, and cannot control the actuator 51 in the overhead time.

Specifically, for a longer overhead time, the EUV light generation control unit 5 detects a state of the actuator 51 with a longer delay, and the delay in detection may cause a delay in next start of control.

Thus, in embodiments described below, an EUV light generation control unit 5 that can start next control earlier is exemplified.

4. Description of EUV Light Generation Control Unit of Embodiment 1

Next, an EUV light generation control unit 5 of Embodiment 1 will be described. Components similar to those described above are denoted by the same reference numerals, and overlapping descriptions are omitted unless otherwise stated.

4.1 Configuration

The EUV light generation control unit 5 of Embodiment 1 predicts a movement completion time of an actuator 51 when transmitting a movement instruction to the actuator 51, and transmits a polling signal S10 after expiration of the predicted movement completion time.

4.2 Operation

Figure 5:
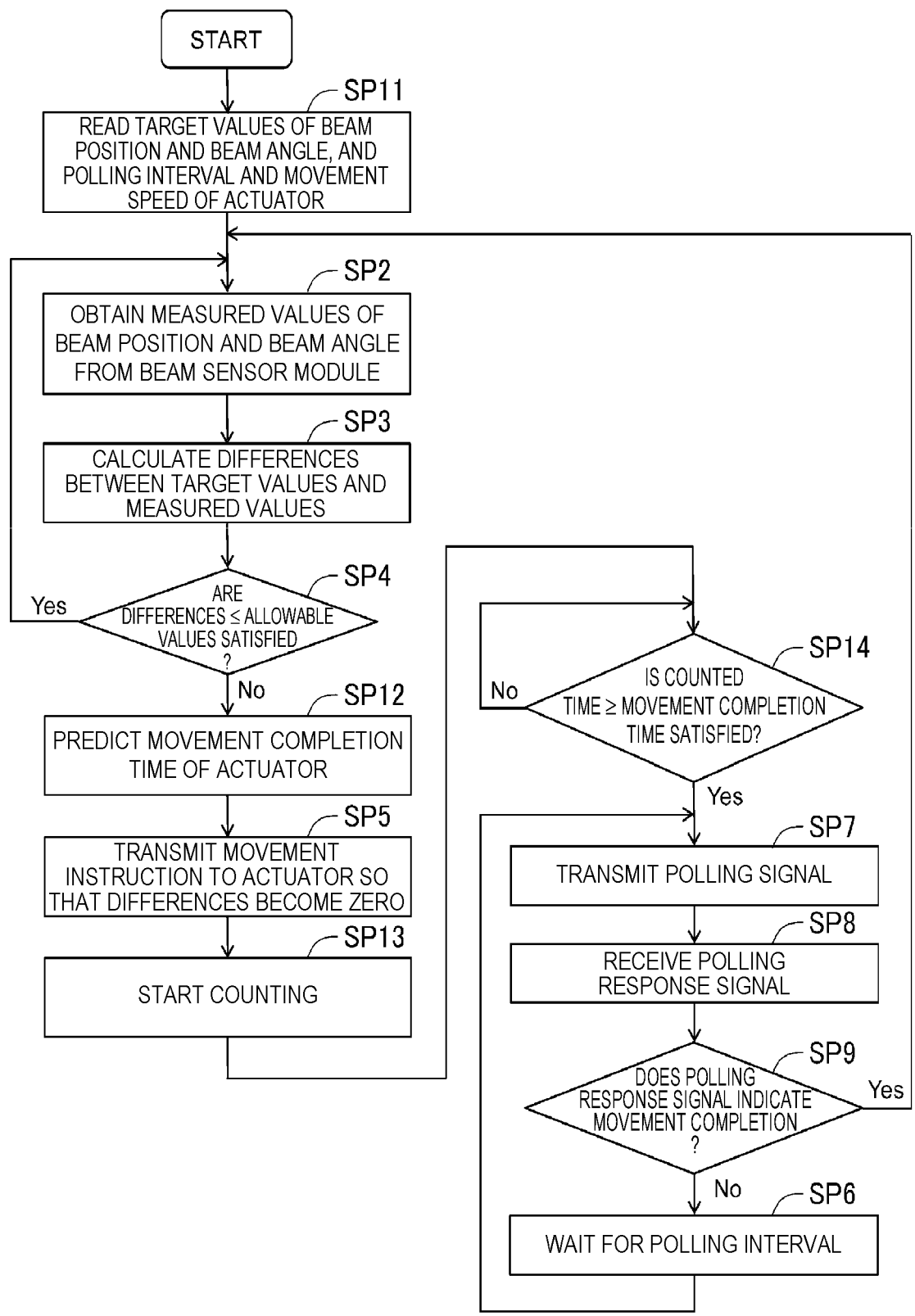
FIG. 5 is a flowchart of a control processing routine for an EUV light generation control unit of Embodiment 1 to control an actuator.

FIG. 5 is a flowchart of a control processing routine for the EUV light generation control unit 5 of Embodiment 1 to control the actuator 51. As shown in FIG. 5, in step SP11, the EUV light generation control unit 5 reads a polling interval and a movement speed of the actuator 51 previously registered in an internal memory, and a target position and a target angle of a laser beam L1, and goes to step SP2.

The EUV light generation control unit 5 sequentially performs processes in steps SP2 to SP4 as in the comparative example, and compares a difference from a target position and a difference from a target angle calculated based on a beam-related signal S44 with allowable values.

If at least one of the difference from the target position and the difference from the target angle is larger than the allowable value, the EUV light generation control unit 5 goes to step SP12, and predicts a movement completion time of the actuator 51. For example, the EUV light generation control unit 5 calculates an amount of movement of the actuator 51 so that the difference beyond the allowable value becomes zero, and multiplies the amount of movement by the movement speed read in step SP11 to predict the movement completion time, and goes to step SP5.

In step SP5, the EUV light generation control unit 5 transmits a movement instruction including the amount of movement and the movement direction of the actuator 51 to the actuator 51, and goes to step SP13. In step SP13, the EUV light generation control unit 5 starts counting using an internal clock or the like, and goes to step SP14.

In step SP14, the EUV light generation control unit 5 recognizes whether or not the movement completion time predicted in step SP12 has elapsed since start of counting in step SP13. If the predicted movement completion time has not yet elapsed, the EUV light generation control unit 5 waits for expiration of the movement completion time. If the predicted movement completion time has elapsed, the EUV light generation control unit 5 resets the counting started in step SP13, and then goes to step SP7.

In step SP7, the EUV light generation control unit 5 transmits a polling signal S10 to the actuator 51, and then in step SP8, waits for a polling response signal S12 transmitted from the actuator 51. When receiving the polling response signal S12, the EUV light generation control unit 5 goes to step SP9.

In step SP9, the EUV light generation control unit 5 recognizes whether or not the polling response signal S12 indicates movement completion. If the polling response signal S12 does not indicate movement completion, the EUV light generation control unit 5 goes to step SP6, waits for time of the polling interval read in step SP1, and returns to step SP7 at a time point at the end of the polling interval. If the polling response signal S12 indicates movement completion, the EUV light generation control unit 5 returns to step SP2, and starts to monitor a position and an angle of a traveling direction of the laser beam L1.

The EUV light generation control unit 5 predicts the movement completion time of the actuator 51 and then transmits the movement instruction to the actuator 51. However, the EUV light generation control unit 5 may transmit the movement instruction and then predict the movement completion time.

The EUV light generation control unit 5 may transmit the polling signal S10 so that the actuator 51 receives the polling signal S10 immediately after expiration of the predicted movement completion time. For example, in step SP12 or SP14 of the procedure in Embodiment 1, the EUV light generation control unit 5 subtracts a communication time registered in the internal memory or the like from the predicted movement completion time. Then, in step SP14, the EUV light generation control unit 5 recognizes whether or not a time obtained as a result of the subtraction has elapsed since start of counting in step SP13. As such, the EUV light generation control unit 5 transmits the polling signal S10 at a time point before an end time point of the predicted movement completion time by the communication time, thereby allowing the actuator 51 to receive the polling signal S10 immediately after expiration of the movement completion time.

Further, the control processing of the actuator 51 described above is applicable to control of an actuator 23 connected to a subchamber 21. However, in the control of the actuator 23, in step SP1, a polling interval of the actuator 23, and a target position and an angle of a traveling direction of a droplet DL ejected from a target supply unit 12 to a plasma generation region 31 are read. In step SP2, a droplet-related signal S15 is obtained from a target sensor 15. In step SP3, a difference from a target position and a difference from a target angle are calculated based on the droplet-related signal S15. In this manner, the EUV light generation control unit 5 is applicable to the control of the actuator 23.

4.3 Effect

Figure 6:
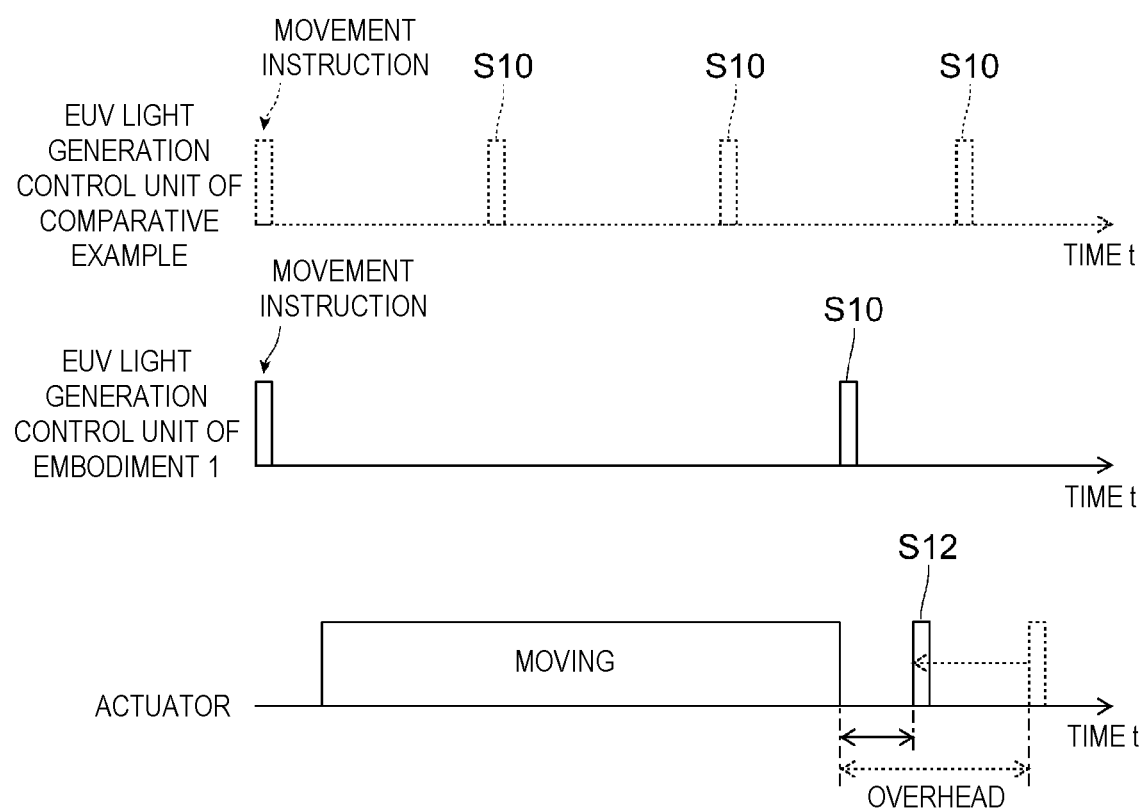
FIG. 6 is a timing chart of operations of the EUV light generation control unit and the actuator of Embodiment 1.

FIG. 6 is a timing chart of operations of the EUV light generation control unit 5 and the actuator 51 of Embodiment 1. As shown in FIG. 6, the EUV light generation control unit 5 predicts the movement completion time of the actuator 51, and transmits the polling signal S10 after expiration of the movement completion time.

Thus, the actuator 51 can receive the polling signal S10 immediately after actually completing movement, and return the polling response signal S12 to the EUV light generation control unit 5. Thus, an overhead time is generally only the communication time between the EUV light generation control unit 5 and the actuator 51 irrespective of the polling interval uniquely set according to the movement speed or the like of the actuator 51, and thus can be significantly reduced as compared to the comparative example. The calculation processing for the prediction by the EUV light generation control unit 5 takes approximately 1 ms. In this respect, it is confirmed that the overhead time can be reduced by 125 ms on average when the polling interval of the actuator 51 is 250 ms and the communication time between the actuator 51 and the EUV light generation control unit 5 is 50 ms.

When the EUV light generation control unit 5 transmits the polling signal S10 at the time point before the end time point of the predicted movement completion time by the communication time, the overhead time can be eliminated.

As such, the EUV light generation control unit 5 can transmit the polling signal S10 so that the actuator 51 receives the polling signal S10 after expiration of the predicted movement completion time, thereby reducing or substantially eliminating the overhead time. Thus, the EUV light generation control unit 5 can immediately detect that the actuator 51 has completed movement, and again adjust the position and the angle of the traveling direction of the laser beam L1. As such, the EUV light generation control unit 5 can start next control earlier.

5. Embodiment 2

Next, an EUV light generation control unit 5 of Embodiment 2 will be described. Components similar to those described above are denoted by the same reference numerals, and overlapping descriptions are omitted unless otherwise stated.

5.1 Configuration

The EUV light generation control unit 5 of Embodiment 2 is the same as that of Embodiment 1 in predicting a movement completion time of an actuator 51 when transmitting a movement instruction to the actuator 51. However, in Embodiment 1, transmission of a polling signal S10 is started after expiration of the movement completion time, while in Embodiment 2, transmission of a polling signal S10 is started before expiration of the movement completion time.

5.2 Operation

Figure 7:
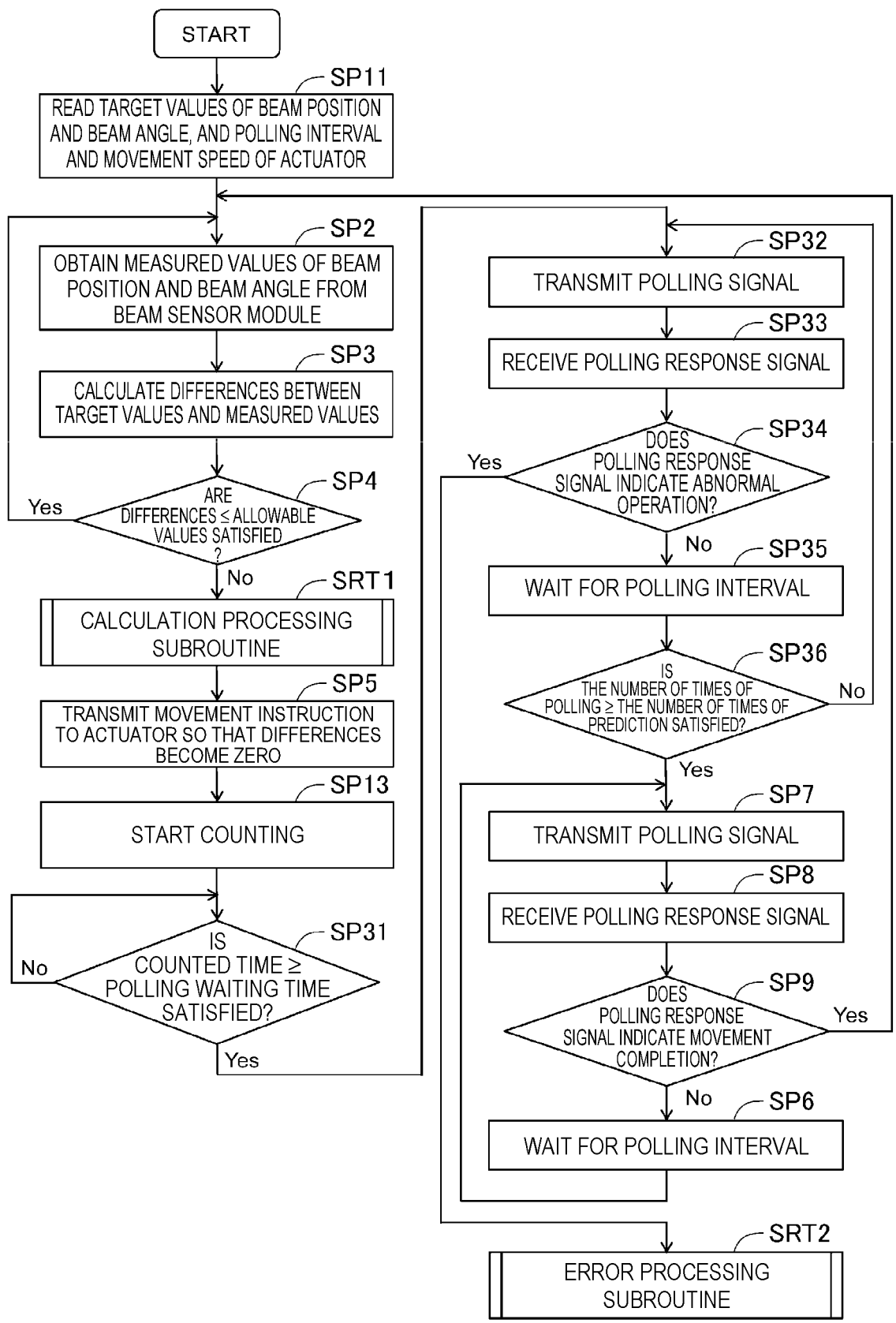
FIG. 7 is a flowchart of a control processing routine for an EUV light generation control unit of Embodiment 2 to control an actuator.
Figure 8:
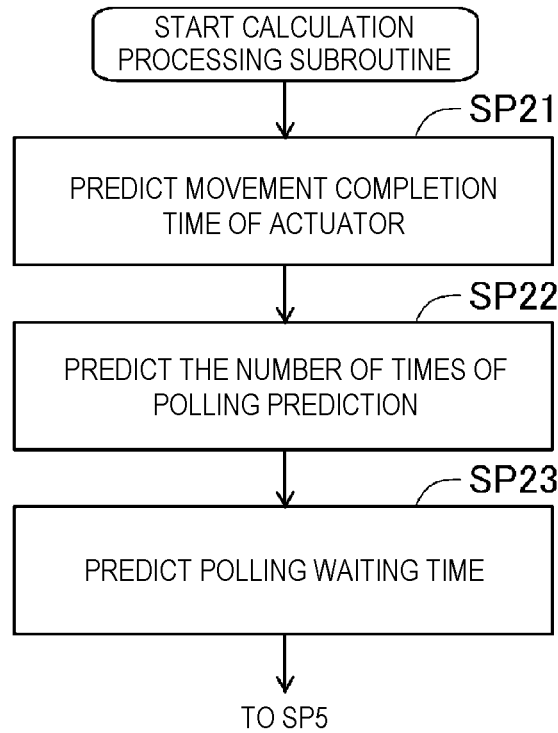
FIG. 8 is a flowchart of a calculation processing subroutine.
Figure 9:
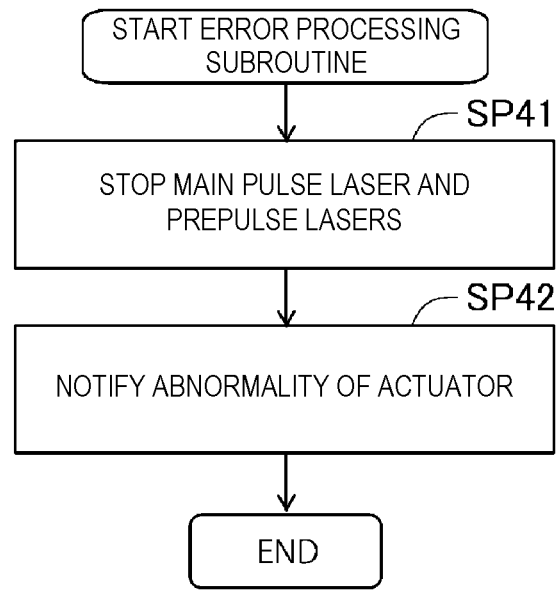
FIG. 9 is a flowchart of an error processing subroutine.

FIG. 7 is a flowchart of a control processing routine for the EUV light generation control unit 5 of Embodiment 2 to control the actuator 51. FIG. 8 is a flowchart of a calculation processing subroutine. FIG. 9 is a flowchart of an error processing subroutine.

As shown in FIG. 7, as in Embodiment 1, the EUV light generation control unit 5 sequentially performs processes in steps SP11 and SP2 to SP4, and compares a difference from a target position and a difference from a target angle calculated based on a beam-related signal S44 with allowable values.

If at least one of the difference from the target position and the difference from the target angle is larger than the allowable value, the EUV light generation control unit 5 starts a calculation processing subroutine SRT1, and goes to step SP21 in FIG. 8. In step SP21, the EUV light generation control unit 5 performs calculation, for example, as in step SP12 in Embodiment 1 to predict a movement completion time of the actuator 51, and goes to step SP22.

In step SP22, the EUV light generation control unit 5 calculates the number of times of polling prediction. The number of times of polling prediction is the number of times of transmission of a polling signal S10 at a predetermined polling interval in the movement completion time predicted in step SP21. For example, the EUV light generation control unit 5 divides the movement completion time predicted in step SP21 by a polling interval of the actuator 51 read in step SP11, and calculates a value obtained by subtracting one from an integer value of a result of the division as the number of times of polling prediction. A time width of the polling signal S10 is several microseconds or less, which can be ignored in this case. After finishing calculating the number of times of polling prediction, the EUV light generation control unit 5 goes to next step SP23.

In step SP23, the EUV light generation control unit 5 calculates a polling waiting time. The polling waiting time is a time for waiting transmission of the polling signal S10. Considering a case where the polling signal S10 is consecutively transmitted at a uniquely set polling interval in the predicted movement completion time, the movement completion time is not necessarily an integral multiple of the polling interval. Thus, there may be an extra period between a transmission time of the last polling signal S10 in the movement completion time and expiration of the movement completion time. Since the extra period is shorter than the polling interval, the actuator 51 can return a polling response signal S12 indicating movement completion in response to the polling signal S10 after expiration of the polling interval since transmission of the last polling signal S10. Then, a difference time between the polling interval and the extra period is an overhead. Thus, the polling waiting time is set to be longer than the polling interval and shorter than twice the polling interval. Thus, the number of times of polling prediction is a value obtained by subtracting one from the result of the division of the movement completion time by the polling interval.

For example, the movement completion time predicted in step SP21 is defined as X, the number of times of polling prediction calculated in step SP22 is defined as Y, and the polling interval of the actuator 51 read in step SP11 is defined as Z. In that case, the EUV light generation control unit 5 can calculate the polling waiting time by X-(Y×Z). Alternatively, the movement completion time X predicted in step SP21 is divided by the polling interval Z of the actuator 51 read in step SP11, and a remainder of the division is defined as R. In that case, the EUV light generation control unit 5 can calculate the polling waiting time by R+Z. After finishing calculating the polling waiting time, the EUV light generation control unit 5 goes to step SP5 of a main routine in FIG. 7.

As in Embodiment 1, in step SP5, the EUV light generation control unit 5 transmits a movement instruction including an amount of movement and a movement direction to the actuator 51. In next step SP13, the EUV light generation control unit 5 starts counting using an internal clock or the like, and goes to step SP31.

In step SP31, the EUV light generation control unit 5 waits for expiration of the polling waiting time calculated in step SP23 since start of counting in step SP13. If the polling waiting time has elapsed, the EUV light generation control unit 5 resets the counting started in step SP13, and then goes to step SP32.

In step SP32, the EUV light generation control unit 5 transmits the polling signal S10 to the actuator 51, and goes to step SP33. In step SP33, the EUV light generation control unit 5 waits for the polling response signal S12 transmitted from the actuator 51, and goes to step SP34 when receiving the polling response signal S12.

In step SP34, the EUV light generation control unit 5 recognizes whether or not the polling response signal S12 indicates abnormal operation. If the polling response signal S12 indicates being in operation, the EUV light generation control unit 5 goes to step SP35, and waits for time of the polling interval read in step SP11. Then, the EUV light generation control unit 5 goes to step SP36 at a time point at the end of the polling interval.

In step SP36, the EUV light generation control unit 5 recognizes whether or not the number of times of actual transmission of the polling signal S10 after transmission of the movement instruction to the actuator 51 is equal to or larger than the number of times of polling prediction calculated in step SP22.

If the number of times of actual transmission of the polling signal S10 is smaller than the number of times of polling prediction, the EUV light generation control unit 5 returns to step SP32. If the number of times of actual transmission of the polling signal S10 is equal to or larger than the number of times of polling prediction, this means that the actuator 51 is approaching movement completion. In this case, as in Embodiment 1, the EUV light generation control unit 5 performs processes in steps SP6 to SP9. Specifically, the EUV light generation control unit 5 consecutively transmits the polling signal S10 at a predetermined polling interval until receiving the polling response signal S12 indicating movement completion. When receiving the polling response signal S12 indicating movement completion, the EUV light generation control unit 5 returns to step SP2 as in Embodiment 1, and again starts to monitor a position and an angle of a traveling direction of a laser beam L1.

As such, the EUV light generation control unit 5 monitors whether or not the actuator 51 abnormally operates at the polling interval until transmitting the polling signals S10 for the number of times of polling prediction. The EUV light generation control unit 5 also monitors whether or not the actuator 51 has completed movement at the polling interval after confirming normal operation of the actuator 51 based on the polling response signals S12 for the number of times of polling prediction.

If the polling response signal S12 transmitted from the actuator 51 indicates abnormal operation before the EUV light generation control unit 5 transmits the polling signals S10 for the number of times of polling prediction, the EUV light generation control unit 5 starts an error processing subroutine SRT2.

Specifically, the EUV light generation control unit 5 goes to step SP41 in FIG. 9, stops a first prepulse laser 41, a second prepulse laser 42, and a main pulse laser 43, and goes to step SP42. In step SP42, the EUV light generation control unit 5 notifies that the actuator 51 has abnormally operated. For example, the EUV light generation control unit 5 causes an external display device to display that the actuator 51 has abnormally operated. In addition to or instead of the display, the EUV light generation control unit 5 may transmit that the actuator 51 has abnormally operated to an external device such as an exposure device.

The EUV light generation control unit 5 finishes notifying that the actuator 51 has abnormally operated in step SP42, and then finishes the main routine.

As such, when the actuator 51 has abnormally operated, the EUV light generation control unit 5 can stop output of a laser apparatus 2 to prevent a laser beam L from being consecutively applied in a displaced manner from a target position in a plasma generation region 31.

The control processing of the actuator 51 in FIG. 7 is applicable to control of an actuator 23 connected to a subchamber 21. However, in the control of the actuator 23, in step SP11, a polling interval and a movement speed of the actuator 23, and a target position and an angle of a traveling direction of a droplet DL ejected from a target supply unit 12 to the plasma generation region 31 are read. In step SP2, a droplet-related signal S15 is obtained from a target sensor 15. In step SP3, a difference from a target position and a difference from a target angle are calculated based on the droplet-related signal S15.

5.3 Effect

Figure 10:
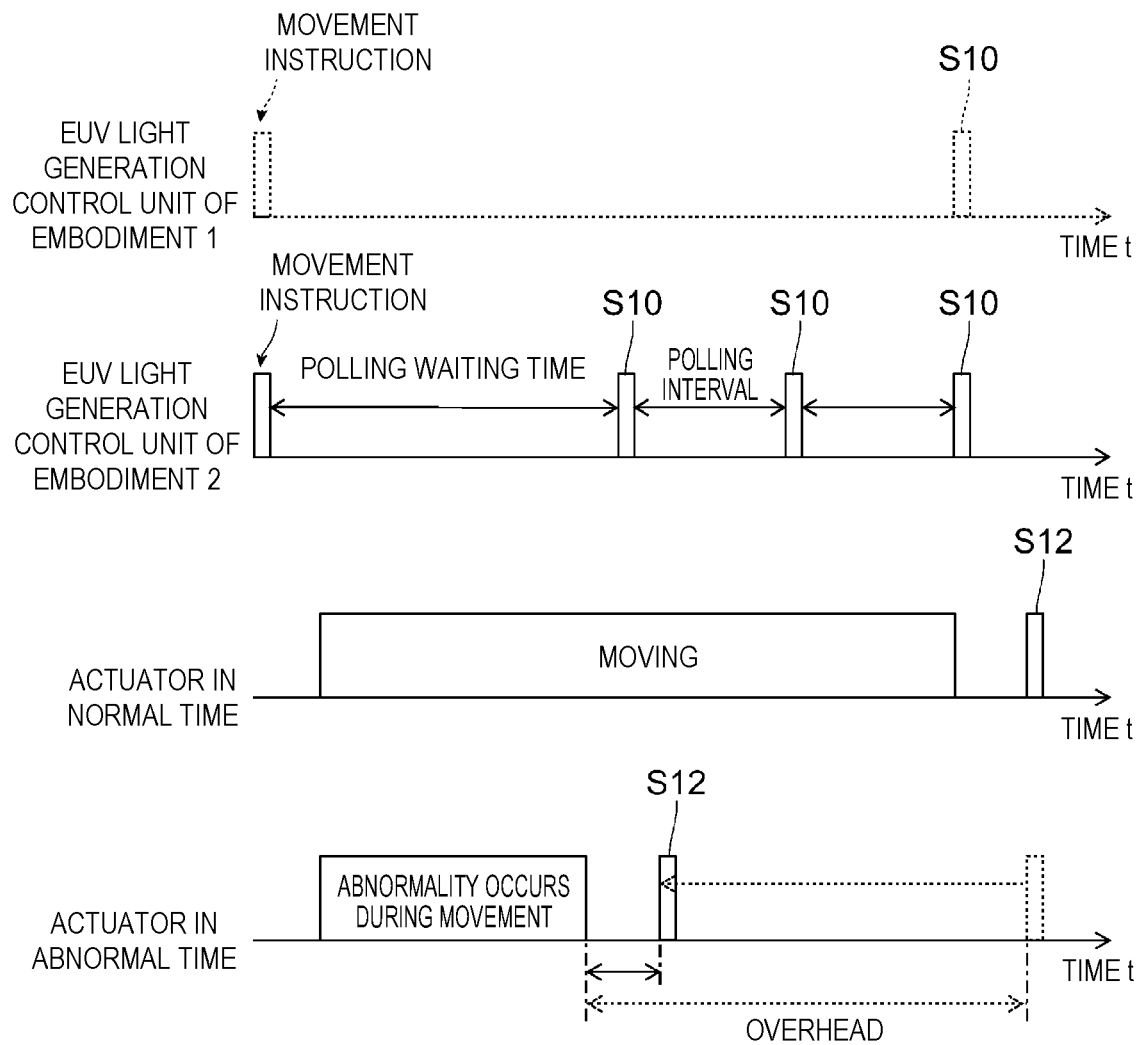
FIG. 10 is a timing chart of operations of the EUV light generation control unit and the actuator of Embodiment 2.

FIG. 10 is a timing chart of operations of the EUV light generation control unit 5 and the actuator 51 of Embodiment 2. As shown in FIG. 10, the EUV light generation control unit 5 of this embodiment transmits the polling signal S10 so that the actuator 51 receives the polling signal S10 after expiration of the predicted movement completion time as in Embodiment 1.

Thus, if the actuator 51 has normally operated without any abnormal operation, the EUV light generation control unit 5 can immediately detect that the actuator 51 has completed movement, and again adjust the position and the angle of the traveling direction of the laser beam L1. Thus, the EUV light generation control unit 5 of this embodiment can start next control earlier as in Embodiment 1.

The EUV light generation control unit 5 of this embodiment starts transmitting the polling signal S10 from before the predicted movement completion time.

Thus, even if the actuator 51 abnormally operates, the EUV light generation control unit 5 can receive the polling response signal S12 indicating abnormal operation without waiting for expiration of the predicted movement completion time as in Embodiment 1. Thus, the EUV light generation control unit 5 of this embodiment can immediately detect abnormal operation of the actuator 51, and perform error processing as a measure against the abnormal operation. As a result, if the actuator 51 abnormally operates, unsuitable laser application can be stopped earlier.

Further, the EUV light generation control unit 5 of this embodiment provides the polling waiting time in the predicted movement completion time so that the actuator 51 receives one of the polling signals S10 transmitted at the predetermined polling interval immediately after expiration of the predicted movement completion time.

Thus, the EUV light generation control unit 5 can immediately detect that the actuator 51 has completed movement while transmitting the polling signal S10 at the polling interval uniquely set by the actuator 51.

6. Description of EUV Light Generation Control Unit of Embodiment 3

Next, an EUV light generation control unit 5 of Embodiment 3 will be described. Components similar to those described above are denoted by the same reference numerals, and overlapping descriptions are omitted unless otherwise stated.

6.1 Configuration

The EUV light generation control unit 5 of Embodiment 3 is the same as that of Embodiment 2 in predicting a movement completion time of an actuator 51 and starting to transmit a polling signal S10 from before expiration of the movement completion time when transmitting a movement instruction to the actuator 51. However, in Embodiment 2, a polling waiting time is provided at beginning of the predicted movement completion time, while in Embodiment 3, a polling waiting time is provided at end of the predicted movement completion time.

6.2 Operation

Figure 11:
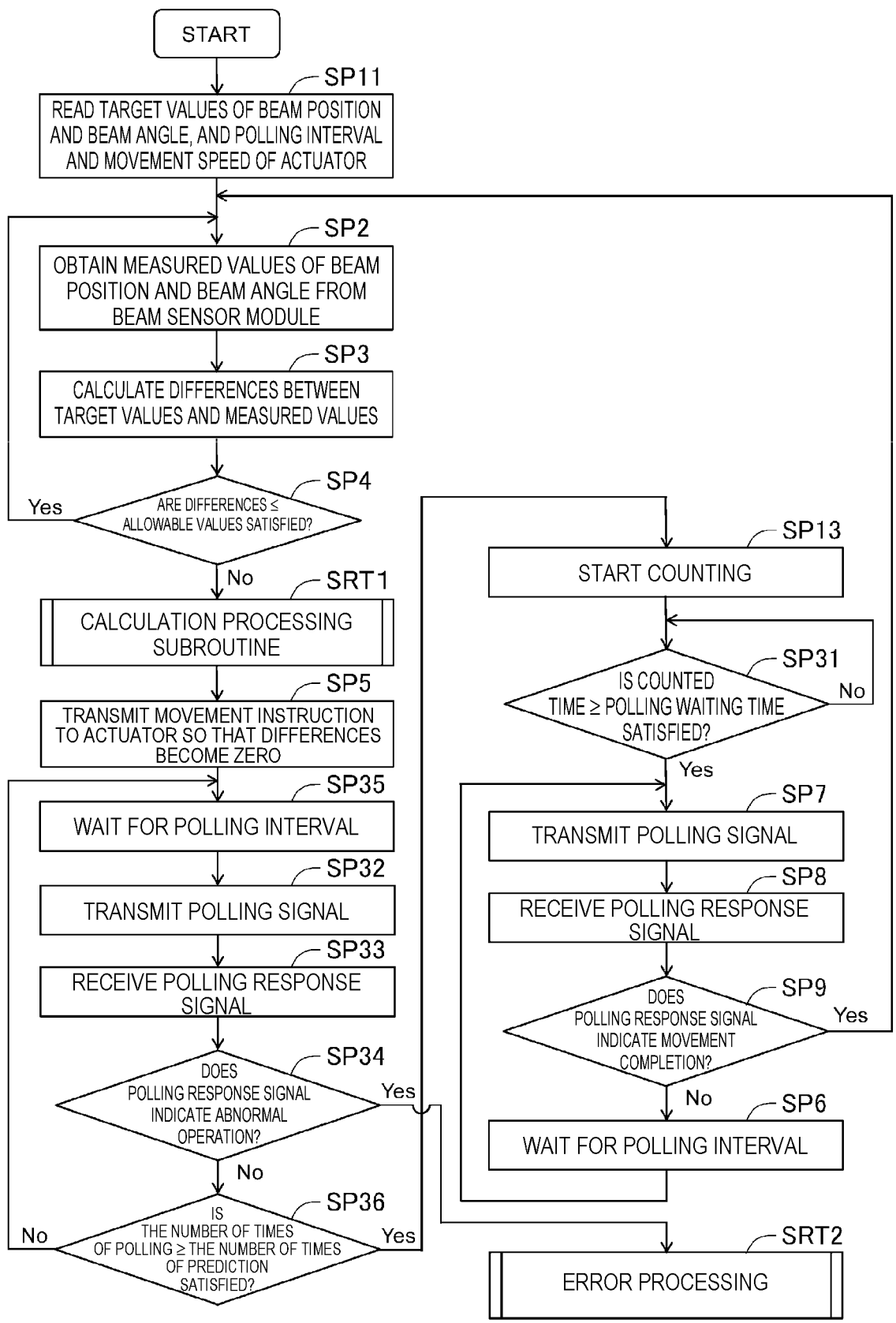
FIG. 11 is a flowchart of a control processing routine for an EUV light generation control unit of Embodiment 3 to control an actuator.

FIG. 11 is a flowchart of a control processing routine for the EUV light generation control unit 5 of Embodiment 3 to control the actuator 51. As shown in FIG. 11, the EUV light generation control unit 5 of this embodiment is different from that of Embodiment 2 only in order of processes in steps.

Specifically, as in Embodiment 2, the EUV light generation control unit 5 of this embodiment sequentially performs processes in steps SP11 and SP2 to SP4 and processes in a calculation processing subroutine SRT1, and then transmits a movement instruction to the actuator 51 in step SP5.

Then, the EUV light generation control unit 5 goes to step SP35, and waits for time of a polling interval read in step SP11. Then, the EUV light generation control unit 5 goes to step SP32 at a time point at the end of the polling interval.

In step SP32, the EUV light generation control unit 5 transmits a polling signal S10 to the actuator 51, and goes to step SP33. In step SP33, the EUV light generation control unit 5 waits for a polling response signal S12 transmitted from the actuator 51, and goes to step SP34 when receiving the polling response signal S12.

In step SP34, the EUV light generation control unit 5 recognizes whether or not the polling response signal S12 indicates abnormal operation. If the polling response signal S12 indicates abnormal operation, the EUV light generation control unit 5 performs an error processing subroutine SRT2 and then finishes a main routine. If the polling response signal S12 indicates being in operation, the EUV light generation control unit 5 goes to step SP36.

In step SP36, the EUV light generation control unit 5 recognizes whether or not the number of times of actual transmission of the polling signal S10 after transmission of the movement instruction to the actuator 51 is equal to or larger than the number of times of polling prediction calculated in step SP22.

If the number of times of actual transmission of the polling signal S10 is smaller than the number of times of polling prediction, the EUV light generation control unit 5 returns to step SP35. If the number of times of actual transmission of the polling signal S10 is equal to or larger than the number of times of polling prediction, this means that the actuator 51 is approaching movement completion. In this case, the EUV light generation control unit 5 goes to step SP13 and starts counting using an internal clock or the like, and in step SP31, waits for expiration of a polling waiting time calculated in the calculation processing subroutine SRT1. Then, as in Embodiment 1, the EUV light generation control unit 5 performs processes in steps SP6 to SP9 to consecutively transmit the polling signal S10 at a predetermined polling interval until receiving the polling response signal S12 indicating movement completion.

As such, the EUV light generation control unit 5 of this embodiment immediately starts to transmit the polling signal S10 prior to waiting processing in the polling waiting time. Then, the EUV light generation control unit 5 monitors whether or not the actuator 51 abnormally operates until transmitting the polling signals S10 for the number of times of polling prediction. When transmitting the polling signals S10 for the number of times of polling prediction, the EUV light generation control unit 5 confirms whether or not the actuator 51 has completed movement at the polling interval after waiting for the polling waiting time.

The control processing of the actuator 51 in FIG. 11 is applicable to control of an actuator 23 connected to a subchamber 21. However, in the control of the actuator 23, in step SP11, a polling interval and a movement speed of the actuator 23, and a target position and an angle of a traveling direction of a droplet DL ejected from a target supply unit 12 to a plasma generation region 31 are read. In step SP2, a droplet-related signal S15 is obtained from a target sensor 15. In step SP3, a difference from a target position and a difference from a target angle are calculated based on the droplet-related signal S15.

6.3 Effect

Figure 12:
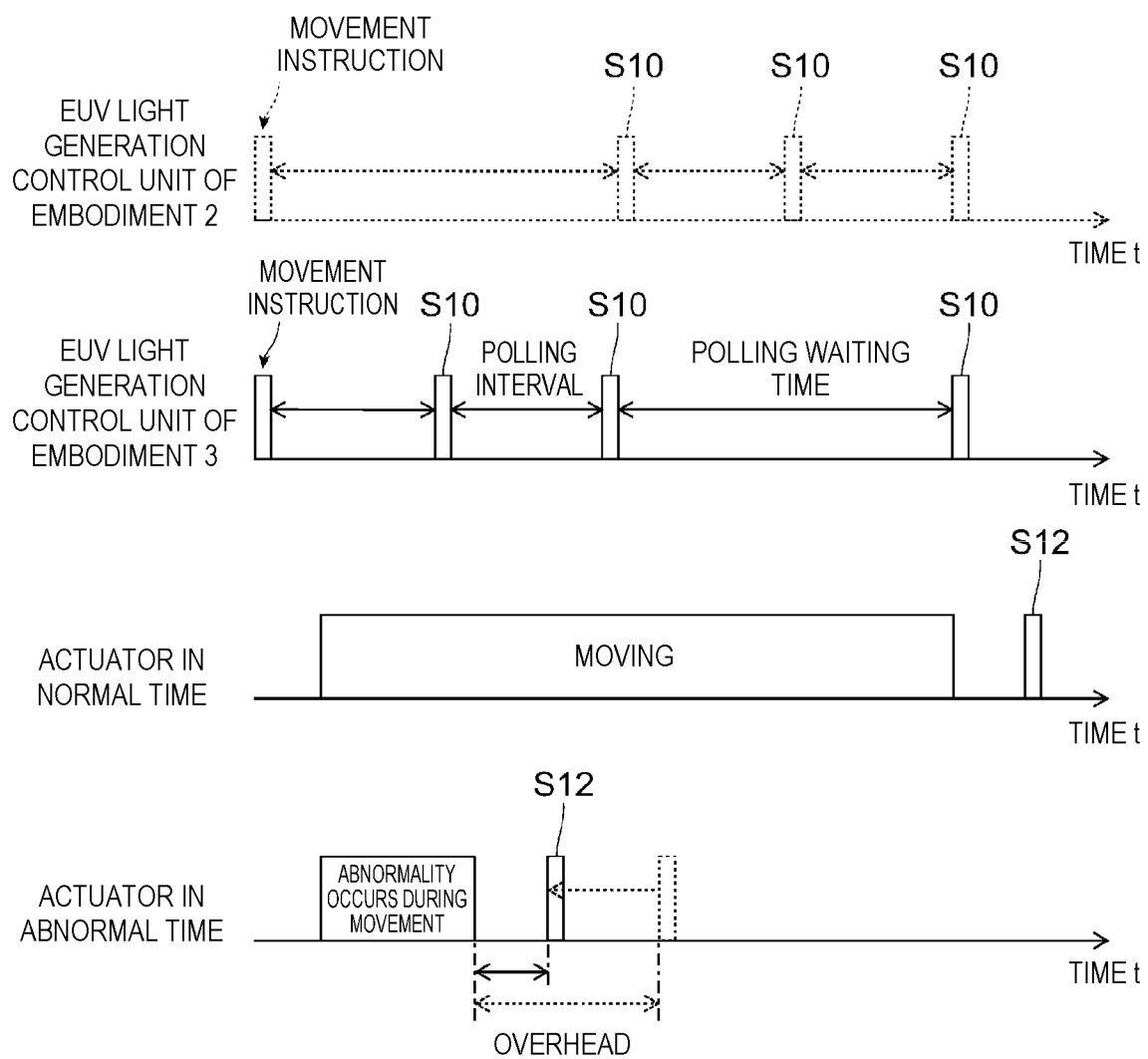
FIG. 12 is a timing chart of operations of the EUV light generation control unit and the actuator of Embodiment 3.

FIG. 12 is a timing chart of operations of the EUV light generation control unit 5 and the actuator 51 of Embodiment 3. As shown in FIG. 12, the EUV light generation control unit 5 of this embodiment provides the polling waiting time at end of the predicted movement completion time.

Thus, the EUV light generation control unit 5 of this embodiment can detect abnormal operation of the actuator earlier than the case of providing the polling waiting time at beginning of the predicted movement completion time as in Embodiment 2. Thus, the EUV light generation control unit 5 can start error processing as a measure against the abnormal operation earlier.

The above descriptions are intended to be illustrative only and not restrictive. Thus, it will be apparent to those skilled in the art that modifications may be made in the embodiments of the present disclosure without departing from the scope of the appended claims.

The terms used throughout the specification and the appended claims should be interpreted as "non-limiting." For example, the term "comprising" or "comprised" should be interpreted as "not limited to what has been described as being comprised." The term "having" should be interpreted as "not limited to what has been described as having." Further, the modifier "a/an" described in the specification and the appended claims should be interpreted to mean "at least one" or "one or more".

What is claimed is:

1. A laser apparatus comprising:
a mirror configured to reflect a laser beam;
an actuator configured to operate the mirror; and
a controller configured to transmit a movement instruction to the actuator,
the controller predicting a movement completion time of the actuator, and transmitting a polling signal so that the actuator receives the polling signal after expiration of the predicted movement completion time, the controller transmitting the polling signal at a predetermined polling interval from before expiration of the predicted movement completion time.

2. The laser apparatus according to claim 1, wherein the controller provides a polling waiting time for waiting for transmission of the polling signal in the predicted movement completion time so that the actuator receives one of the polling signals transmitted at the predetermined polling interval after expiration of the predicted movement completion time.

3. The laser apparatus according to claim 2, wherein the controller provides the polling waiting time at beginning of the predicted movement completion time.

4. The laser apparatus according to claim 2, wherein the controller provides the polling waiting time at end of the predicted movement completion time.

5. An extreme ultraviolet light generation system comprising:
an actuator configured to operate an object to be moved; and
a controller configured to transmit a movement instruction to the actuator,
the controller predicting a movement completion time of the actuator, and transmitting a polling signal to inquire a state of the actuator so that the actuator receives the polling signal after expiration of the movement completion time, the controller transmitting the polling signal at a predetermined polling interval from before expiration of the predicted movement completion time.

* * * * *